Figure 13:
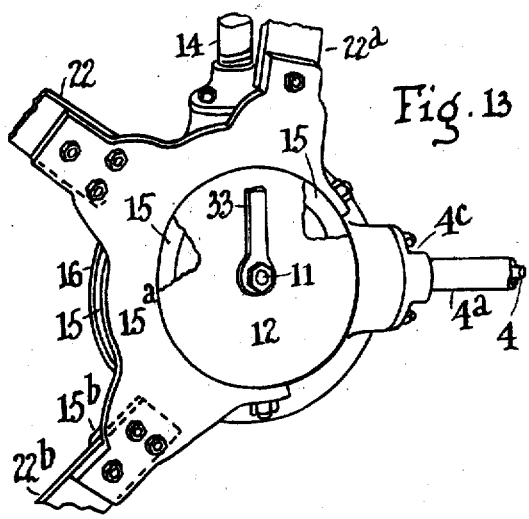

D. DAVEY & H. MAISON.
SAWING MACHINE FOR HALVING CARCASSES.
APPLICATION FILED MAR. 13, 1916.
1,204,345.
Patented Nov. 7, 1916.
3 SHEETS—SHEET 1.
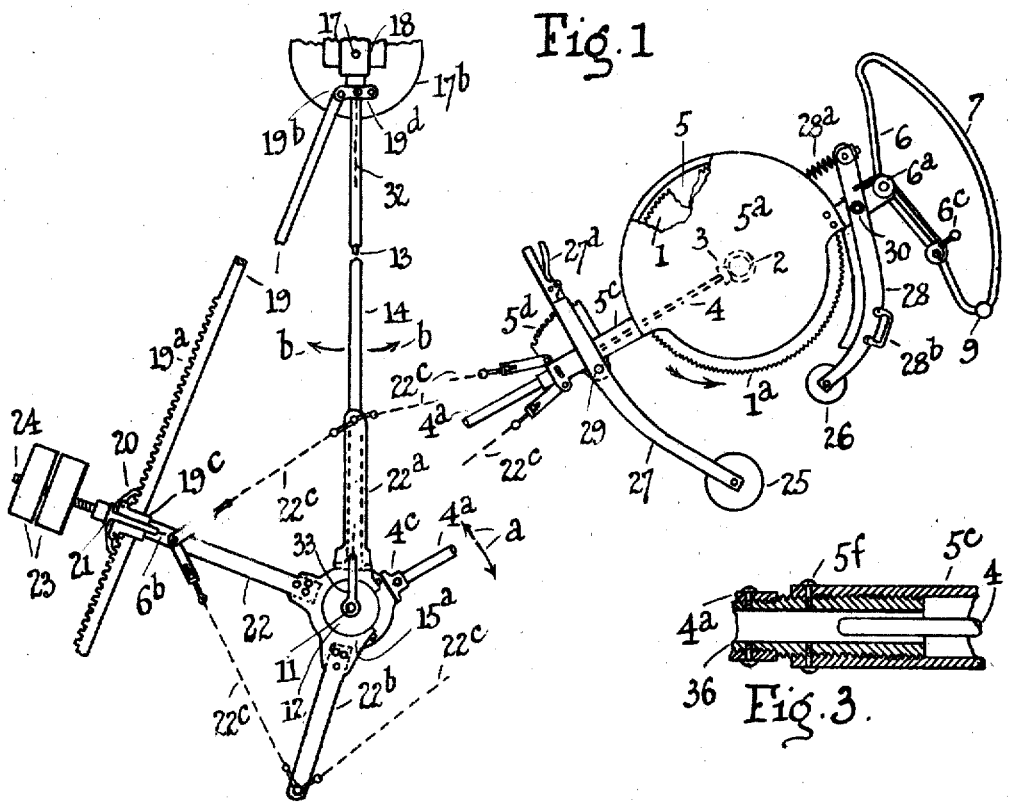
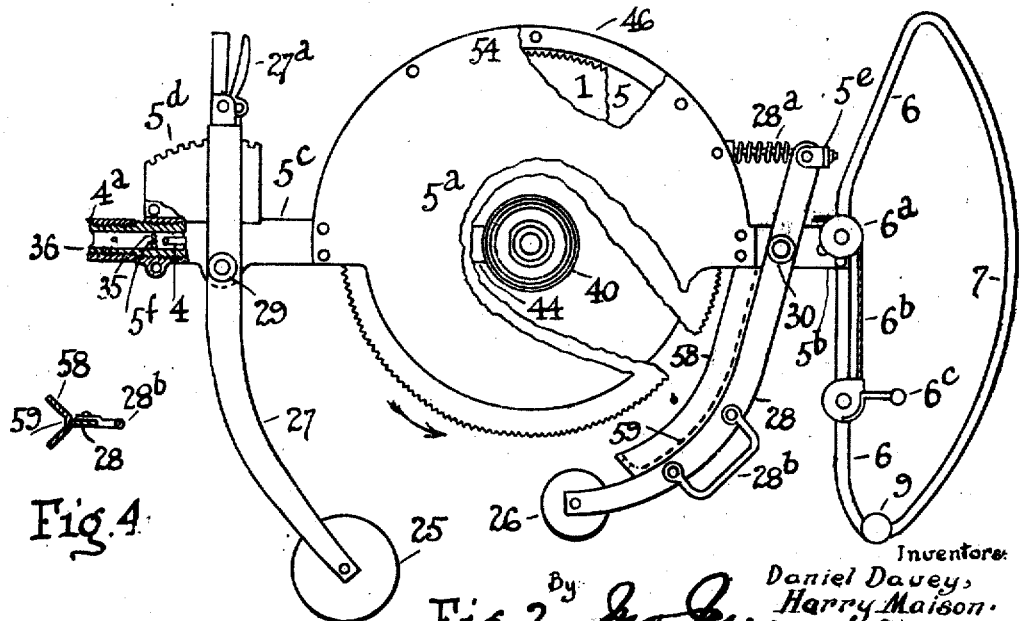
Inventors:
Daniel Davey,
Harry Maison.
By *Jno. [signature]*
Atty.

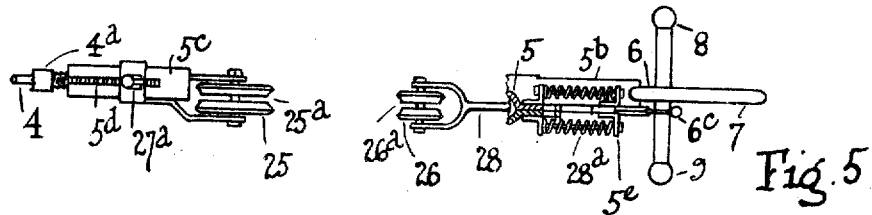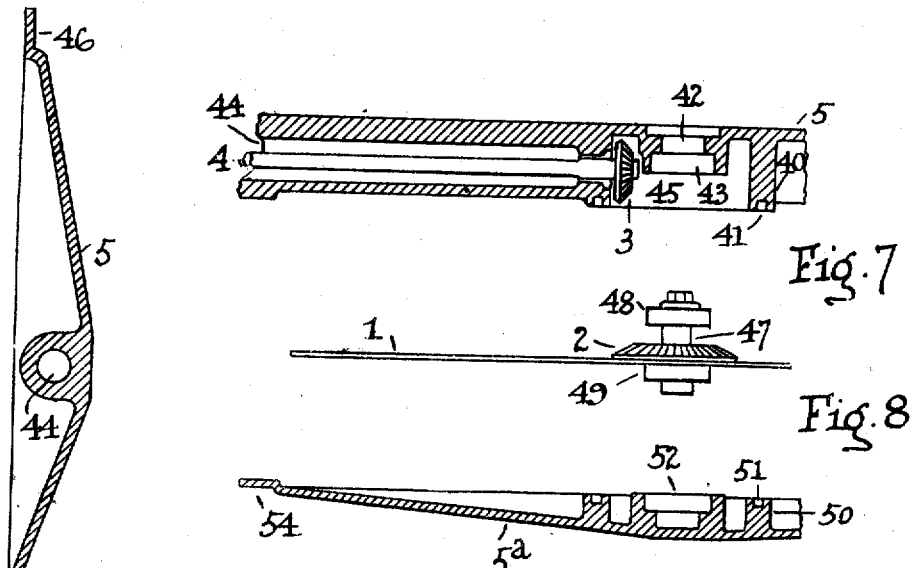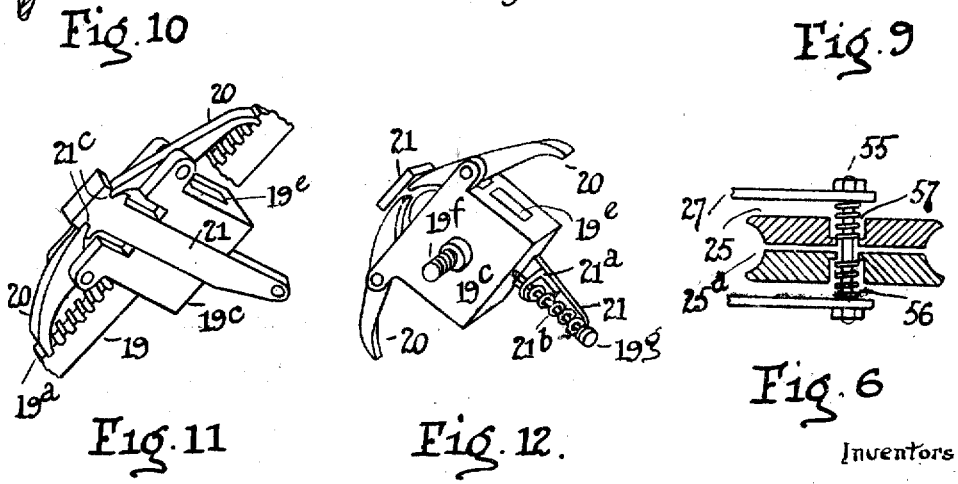

D. DAVEY & H. MAISON.
SAWING MACHINE FOR HALVING CARCASSES.
APPLICATION FILED MAR. 13, 1916.

1,204,345.

Patented Nov. 7, 1916.
3 SHEETS—SHEET 3.

Inventors:—
Daniel Davey,
Harry Maison.
By Atty.

UNITED STATES PATENT OFFICE.

DANIEL DAVEY, OF MARIBYRNONG, AND HARRY MAISON, OF FLEMINGTON, VICTORIA, AUSTRALIA.

SAWING-MACHINE FOR HALVING CARCASSES.

1,204,345.   Specification of Letters Patent.   Patented Nov. 7, 1916.

Application filed March 13, 1916. Serial No. 83,929.

*To all whom it may concern:*

Be it known that we, DANIEL DAVEY, a subject of the King of Great Britain and Ireland, &c., residing at Maribyrnong, in the State of Victoria, Commonwealth of Australia, and HARRY MAISON, a subject of the King of Great Britain and Ireland, &c., residing at Flemington, in the State of Victoria, Commonwealth of Australia, have invented certain new and useful Improvements in Sawing-Machines for Halving Carcasses; and we do hereby declare the following to be a full, clear, and exact description of the invention, such as will enable others skilled in the art to which it appertains to make and use the same.

Our machine is of that kind in which a circular saw, in a casing from which it partly projects, has a central bevel wheel in mesh with a bevel wheel attached to a lateral shaft to be rotated, and extending beyond the casing, the saw being movable in and out of the vertical plane into any position required for halving a beef or other carcass, which is suspended in the usual manner. Our machine is to be used principally in abattoirs, and, besides the halving aforesaid, it is adapted to otherwise saw meat containing thick bone. Our improvements enable a butcher to attain more satisfactory results than hitherto in regard to speed of operations and general efficiency—especially when the bones of successive carcasses vary from those which are gristly to those which are hard and brittle.

Our machine needs no separate appliance for making a preliminary division of the carcasses at the end of the backbone. As previous circular saws for carcass splitting proved unsatisfactory, cleaving machines have been proposed which involved the use of a preliminary dividing means as aforesaid; and another drawback was that they produced splintering of brittle bone which would cause injury to workmen. And cleavers do not halve carcasses leaving smooth surfaces.

We arrange the saw casing so that its internal rotating parts are protected from becoming fouled, while easy running is promoted, and lubrication provided. The saw casing narrows or tapers from its central part to its edges.

The machine has any suitable joints such that the butcher can pull the saw to or push it from him, and can move it to different planes, and to different heights, and shift it to the right or left of its previous position. This enables him to make a clean and correct cut even while a carcass sways. The joints we shall illustrate are, at the suspended head of the machine, a pivot joint and a rotary joint; on the saw side of the machine, a rotary joint (preferably located close to the saw, and which need not allow of saw movement far from the vertical plane); and, in an intermediate position of the frame or saw supports, a pivot joint which we make of box form.

We provide means adapted to be guided by the spinal column of the carcass, near the cutting edge of the saw, the holding of which to the carcass is thus assisted, to enable the butcher to correctly halve the carcass. These means are both outside and inside the carcass cavity, and are ordinarily grooved rollers between which part of the carcass is gripped, but, as a modification, we may use other contact members, such as slides. The rollers are on arms which are pivoted on framing near the saw. The rollers are best composed of sections having means to yieldingly press them toward one another.

Our improvements include a guard or saw-dust receiver to promote cleanliness, to save time; and if desired to enable the sawdust, which is useful as food material, to be utilized.

Controlling means are provided—including vertical and transverse handles, near the saw, and there may be an electric switch near the handles to enable the driving power to be economized, by stopping the saw rotation when cutting is not required. Safety is also thus promoted.

We provide means, as a rack bar, adapted to be free from pawl mechanism during sawing; but the butcher, through connecting means as a wire from the pawl mechanism to a trigger on the handles he controls, can engage the pawls with the rack, and thus can stop the saw from upward or downward movement.

The head gear of our machine may be adapted to travel to allow the machine to be shifted from one carcass to another; but the movement of successive carcasses to and from the machine is in some cases preferred.

Hitherto a butcher, operating a rotating cutter, stood facing the carcass cavity with the cutter rotating toward him. We find the butcher's best position is facing the back of the carcass, with the saw base rotating toward him. Thus the direction of rotation and of cut becomes the reverse of that hitherto employed. The attacking of the carcass from the back, and the cutting of it inwardly to the cavity are thus avoided, and the saw deflecting influences of gristly and other matter at the outer side of the carcass are escaped.

There are various novel features in our invention which will now be described by the aid of the accompanying drawings, but the construction illustrated may be modified as to designs and proportions of parts, and minor details, while retaining matter which is claimed hereinafter.

Figure 14:
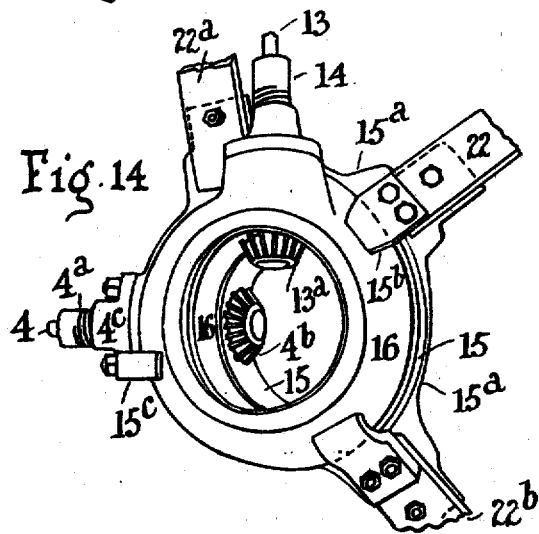
Figure 15:
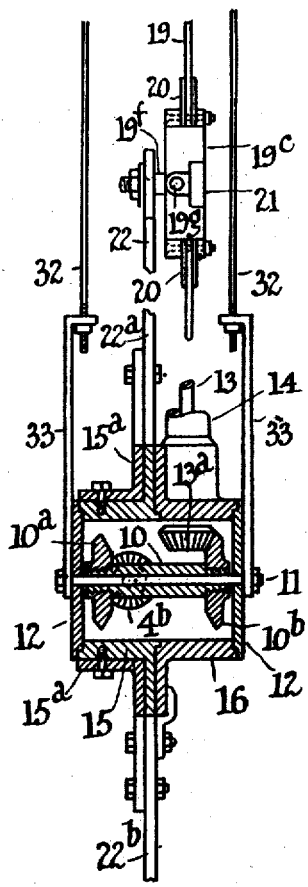
Figure 17:
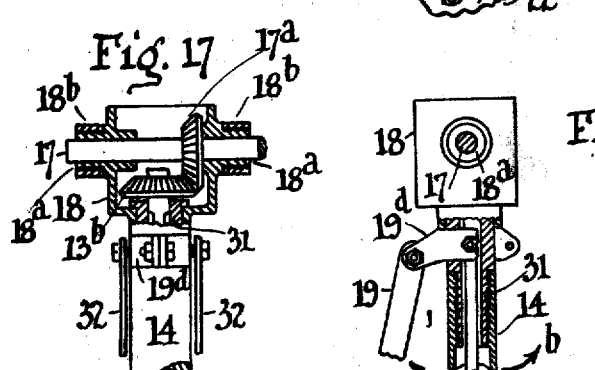
Figure 16:
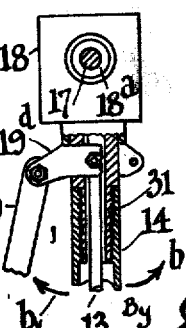

Figure 1 is a diagrammatic view of the machine with the saw raised, and omitting some details shown in other figures. To save space some parts are broken out and the remaining parts are shown closed together. Fig. 2 is (on a larger scale than Fig. 1) a side elevation of parts of the machine at the saw end. The saw and a removable cheek of the saw casing are shown partly broken away, and the direction of saw rotation is shown by an arrow. Fig. 3 is—on a larger scale than Fig. 2—a plan in horizontal section showing a joint near the saw. Fig. 4 is a cross section of a detail of Fig. 2. Fig. 5 is a plan of parts in Fig. 2, with the saw and part of its casing omitted. Fig. 6 shows, in section, a roller which helps to guide the saw. Fig. 7 is a horizontal section of part of the saw casing, showing a shaft having a gear wheel. Fig. 8 shows, in plan, part of the saw, its gear wheel, and antifriction bearings on its axle. Fig. 9 is a horizontal section of part of the removable cheek. Fig. 10 is a vertical section through the casing. Figs. 11 and 12 are perspective sketches of pawl mechanism. Figs. 13 and 14 show, from opposite sides, perspective sketches of the box joint. The axle, axle sleeve, pinions, cheeks, and axle straps are removed in the case of Fig. 14. Fig. 15 is an elevation in transverse section through the box joint. Fig. 16 shows a side view, partly in vertical section, of parts at the head of the mechanism; and Fig. 17 shows an elevation at right angles to Fig. 16, also partly in vertical section.

1 shows the circular saw, with its casing 5 connected by a projection 5$^c$ with a shaft casing 4$^a$.

4 is a lateral shaft which extends through the casing 4$^a$ to a pivot or box joint 15, 16, whereby the parts 4, 4$^a$, the saw casing, and the saw are adapted to be swung upwardly or downwardly.

The saw bevel wheel 2, having a hub 47 over an axle, gears with and is driven by a bevel wheel 3, on the shaft 4 which is partly in a tunnel or chamber 44 in casing 5, and partly in the projection 5$^c$, on which is a toothed rack 5$^d$. The casing 5 is open around an arc (which may be semicircular) to allow the saw to project for cutting purposes at 1$^a$.

5$^a$ is the removable cheek of the casing. The edge 46 of the casing, and the edge 54 of the removable cheek, are connected, as by screws. There is a central chamber 45 in the casing adapted to contain lubricant,—formed partly by the saw, and partly by an annular wall 40 projecting inwardly from the casing. The chamber is to contain, and to protect from sawdust, the gear wheels. A similar annular protective wall 50, projects inwardly from the cheek 5$^a$, the saw working between these walls. Each wall is recessed, at 41, 51 respectively, to contain packing, to contact with the saw and reduce friction and noise. At opposite sides of the saw its axle carries antifriction bearings 48, 49, in recesses 43, and 52, in the casing and its removable cheek. A hole 42 in the casing allows access to the axle.

5$^b$ is a projection from the saw casing, to support a handle shank, shown as a distorted elongated vertical ring, having a front 6 and rear 7, respectively providing high and low hand grips, to suit different men, and different positions of the saw. These are not slight differences, for the vertical cut in a suspended beef carcass measures five feet or more. There are hand grips 8, 9 projecting transversely, one at each side from the handle shank, for the respective hands of the butcher. There is a trigger, or small handle 6$^c$, in proximity to the said grips, adapted to operate a cord 6$^b$, (only partly shown) which passes by the aid of any suitable guiding means (as a pulley 6$^a$) to the pawl mechanism aforesaid, 19 being a rack which when engaged by the pawls locks the saw, and when released leaves the saw free to alter its height—as during sawing.

The joint in Fig. 3 is formed as by having an internal thread on the projection 5$^c$, engaged by a thread on a tube 36, which is fixed to the casing 4$^a$. One or more stops, as pins 5$^f$, from tube 36, extend into or through the part 5$^c$, through slots 35 in the latter. These slots are long enough to allow the maximum desired rotary movement of the saw, the plane of which is normally vertical, owing to the weight of the rollers and their arms. After the saw is moved from the vertical plane the latter will naturally be regained when the butcher ceases to prevent it by his control of the handles.

26 on an arm 28 is an outer roller, to fit on and be guided by the ridge along the back of the carcass; and 25 on an arm 27 is an inner roller to fit on and be guided by the internal spinal ridge in the carcass cavity. The ridges act as rails. Arm 27 has a handle 27ª, and is pivoted at 29, and arm 28 is pivoted at 30. These pivots are in projections 5ᵇ, 5ᶜ, of the saw casing or any suitable supports.

26ª and 25ª are roller grooves or recesses, into which the ridges of the carcass project. These rollers have, as in Fig. 6, axles 55, and are composed of a plurality of sections as halves, which are normally pressed together by springs 56, entering recesses 57 in the sections, which are movable apart by the spinal ridge when the width of the latter in the roller groove during sawing so requires.

The inner roller 25 is adjustable as by the rack 5ᵈ engaged by the handle 27ª to press the carcass more or less, or to be located out of contact with it, as when beginning sawing, to keep the roller clear of the kidneys. After the halving cut is partly made, we set the inner roller under or in any predetermined position relatively to the kidneys, against the spinal ridge and it will then be guided down by that ridge as the saw descends.

The arm 28 is shown as a spring depressed arm, which enables the outer roller 26 to automatically follow the curves and irregularities of the carcass as sawing proceeds. Thus there are one or more springs 28ª to depress roller 26, by pressing between lugs 5ᵉ on arm 28, or by pressing on a part of arm 28, and a part of or on the saw casing.

28ᵇ is a handle on the arm 28 to enable the butcher to move the said arm on its pivot. Thus roller 26 can be held farther from the saw than usual, and this is done at first when positioning a carcass for sawing purposes. Even one roller, guided by the spinal column, will considerably assist to secure accurate halving.

The sawdust guard or receptacle to collect flying particles of meat and bone, instead of allowing these to fall on the floor, or to be spattered upon the butcher, and elsewhere, is of any suitable form, as that of a trough. It has sides 58 of any suitable sizes, and a base 59 removably or otherwise attached to any suitable support, as to the arm 28. What the saw hurls from it as it rotates is sticky and masses together, and can be accumulated for commercial purposes.

By toothed gearing in the box joint 15, 16, which has cheeks 12, the shaft 4 is connected to a shaft 13,—called for distinguishing purposes a suspension shaft. Shaft 4 carries in the box 15, 16 a bevel wheel 4ᵇ, engaging a gear wheel 10ª on a sleeve 10, on a suitably supported transverse axle 11, which passes through the cheeks 12. On sleeve 10, a gear wheel 10ᵇ meshes with a bevel wheel 13ª on the shaft 13, which extends upwardly in a casing 14. The side 15 of the joint is connected to the casing 4ª, and the side 16 is attached to the casing 14. The box sides 15, 16 are held between any suitable members as clamps 15ᵇ, 15ᶜ, overlapping the side 16, and extending from the other side. Thus lugs 15ᵇ extend from limbs or arms 22, 22ª, 22ᵇ shown fixed to a claw 15ª, which is fixed on the box side 15 which can rotate relatively to part 16, as indicated by arrows a in Fig. 1. A rotary head joint of casing 14 is provided as by screwing to that casing a tube 31, the top of which is enlarged and rotatably supported on the base of a gear box 18.

When strength and lightness of construction are needed it is useful to attach on that side of the box joint which carries the casing 4ª, the arms 22ª and 22ᵇ and to connect the said arms and the saw casing projection 5ᶜ by tension or tie wires 22ᶜ.

Any suitable means are provided for effecting the rotation of the shafts, gears, and saw. Thus a bevel wheel 13ᵇ on shaft 13, meshes with a bevel wheel 17ª on a shaft 17, which is to be driven by electric or other power. The wheels 13ᵇ, 17ª are in a box 18, which is pivoted to the shaft 17 as by hollow trunnions 18ª. 17ᵇ is a pulley. This pivotal or head joint allows the shaft 13 to be swung to and from the butcher, as indicated by the arrows b.

32 are rods or straps of regulatable length connected to a support 19ᵈ, fixed to the tube 31, the strap bases 33 being connected to the axle 11.

One frame arm 22, is utilized to carry the pawl mechanism, and extends to the rack bar 19, which has any suitable location and end support, as by being pivoted to the collar or member 19ᵈ. The rack bar teeth 19ª are opposite to pawls 20, which are pivoted on a carrier 19ᶜ. The arm 22 is so weighted near its end 24 that when pawls 20 do not fix the arm to the rack, and when the handles are uncontrolled, the weight 23 makes the arm descend, making the saw rise in an arc clear of the cut in the carcass. This is unlike other earlier devices which had the cutting member heavier so that it would not tend to rise when not held down by the butcher. The weight 23 may be made adjustable in any suitable manner. The butcher can promptly arrest the rise of the saw if it springs up from hard bone, by dropping the pawls.

The pawl carrier has a slot 19ᵉ, through which the bar 19 extends to allow sliding of the carrier. This latter has a slide bolt 21, from which the cord 6ᵇ extends to the aforesaid trigger; and there is a carrier projection 19ᶠ, by which to pivot the carrier to the arm 22,—though a pivot is not required when the bar 19 is arcuate, with the axle 11 central. The carrier 19ᶜ has another projection 19ᵍ, and the slide bolt 21 has a lug 21ª, a spring 21ᵇ pressing between the said projection and lug, keeping the slide bolt 21 which controls the pawls 20, in its normal position. These pawls have ends engaging the slide bolt as by entering slide bolt recesses 21°.

Having described this invention, what is claimed by Letters Patent is:—

1. In a carcass sawing machine, a circular saw having a casing from which part of the saw projects, means to rotate the saw, jointed supporting means to allow the casing and saw to be moved into any position required for halving a suspended carcass, a member pivoted on opposite sides of the center of the saw, each member having a roller at its end, to contact with the inside and outside of the carcass to guide the saw.

2. In a carcass sawing machine, a circular saw, and, near its cutting edge, one or more members such as rollers to be guided by the carcass surface, and framing carrying the saw and having weighted means to cause the saw to rise when its handles are uncontrolled, and a device on the framing and connected to the handles, to enable the said rise to be stopped.

3. In a carcass sawing machine, a circular saw, near which are pivoted two arms each carrying a grooved member to be located during sawing with its groove engaging and guided by a separate spinal ridge of the carcass part of said carcass being gripped between the said grooved members.

4. In a carcass sawing machine, a circular saw, and supported near its cutting edge, sections forming a groove and having means to yieldingly press them toward one another, and adapted during sawing to rest on and be guided by a spinal ridge of the carcass.

5. In a carcass sawing machine, a circular saw, and supported near its cutting edge, grooved rollers in sections, with means to yieldingly press the sections toward one another, the sections being adapted, when required during sawing, to rest on and be guided by respective internal and external spinal ridges of a suspended carcass.

6. In a carcass sawing machine, a circular saw having a casing from part of which a portion of the edge of the saw projects, and a sawdust receiver or guard near the said projecting edge and supported from said casing.

7. In a carcass sawing machine, a circular saw having a casing from part of which the saw projects, and a sawdust receiver or guard mounted on an arm connected with said casing, said saw carrying means to contact with and be guided along the outside of the carcass during sawing.

8. In a carcass sawing machine, a circular saw having a casing from part of which the saw projects, a driving shaft and gear wheels in the casing, means to prevent sawdust fouling the said shaft and wheels, an arm connected with said casing which carries means to contact with and be guided along a carcass, and a sawdust receiver or guard mounted on the said arm.

9. In a carcass sawing machine, a circular saw, a frame supporting the saw, an outer arm pivoted to the frame, a roller at the free end of the outer arm, a spring attached to the outer arm to normally locate the roller in operative position, an inner arm pivoted to the frame, a roller at the free end of the inner arm, the inner arm having a handle, a latch adjacent the handle to lock the inner arm in adjusted position, a hand grip extending from the frame, handles extending from the hand grip, means for holding the saw in inoperative position, and a trigger on the grip to operate the latter means.

10. In a carcass sawing machine, the combination of a pivoted depending hollow casing, a gear box at the lower end of the depending hollow casing, means for rotatively mounting the gear box on the depending hollow casing, a saw frame extending from the gear box, said frame having a saw housing open on its under side, a saw mounted in the housing and extending through the open bottom, gearing in the gear box, connections between the gearing and the saw, power means at the upper end of the depending hollow casing, connections from the power means to the gearing, an arm extending from the gear box, a weight mounted thereon, a rack extending from the depending hollow casing, a pawl pivoted to the arm and coöperating with the rack, and means adjacent the saw to release the pawl from the rack to permit the saw to be moved vertically.

11. In a carcass sawing machine, the combination of a frame pivoted to move vertically and horizontally and including a forwardly extending arm having a housing and a rearwardly extending arm having a weight, a saw mounted in the housing, means mounted in the frame for rotating the saw, a hand grip at the end of the forwardly extending arm adjacent the saw, handles extending from opposite sides of the hand grip, pivotally mounted guides on the frame each side the center of the saw, pawl and rack mechanism for holding the saw in adjusted position, and means on the hand grip for operating the pawl.

12. In a carcass sawing machine, the combination of a vertically movable frame, a horizontally movable frame, means for pivotally mounting the vertically movable frame on the lower end of the horizontally movable frame, the vertically movable frame having a housing near one end and a weight at its opposite end, a hand grip adjacent the housing, a rotary saw mounted in the housing, gearing contained in the two frames for rotating the saw, pawl and rack adjacent the weight, means on the hand grip for operating the pawl to hold the saw in adjusted position, and two pivoted levers having rollers at their lower ends to engage the carcass and guide the saw when same is operated.

13. In a carcass sawing machine, the combination of a horizontally movable frame, a vertically movable frame mounted on said horizontally movable frame, a saw housing mounted on the vertically movable frame, means for permitting a slight limited lateral rocking movement of the housing in two directions only on the vertically movable frame, a handle on the saw housing, a rotary saw mounted in the housing, and gearing in the two frames for rotating the saw.

14. In a carcass sawing machine, the combination of a frame, a housing mounted on the frame, a pin and slot connection provided between the housing and the frame to permit a slight rocking movement of the housing, a saw mounted in the frame, a pair of depending arms mounted on the housing and bearing rollers on their lower ends to engage the carcass in the operation of sawing, and means for rotating the saw.

15. In a carcass sawing machine, the combination of a frame, a housing mounted on the frame, said housing comprising two members, one of which is formed with a longitudinal bearing, a horizontal bearing, and an annular flange formed with a depression, the other member having an annular flange formed with a depression and a horizontal bearing, the two members being spaced apart from a point inside the outer meeting edges, a saw mounted in the space, the depressions in the annular flanges adapted to receive packing which engages opposite sides of the saw, a shaft mounted in the horizontal bearings and on which the saw is supported, a gear on the shaft, a shaft mounted in the longitudinal bearing, a gear on the shaft, said gear meshing with the gear on the saw shaft, means for mounting the housing on the frame to permit a slight lateral rocking movement of said housing, and means for operating the longitudinal shaft.

In testimony whereof we affix our signatures.

DANIEL DAVEY.
HARRY MAISON.